(12) United States Patent
Ma et al.

(10) Patent No.: US 10,222,078 B2
(45) Date of Patent: Mar. 5, 2019

(54) METHOD AND DEVICE FOR AIR CONDITIONING WITH HUMIDITY CONTROL

(75) Inventors: Zidu Ma, Ellington, CT (US); Yirong Jiang, Edina, MN (US); Dong Luo, South Windsor, CT (US)

(73) Assignee: CARRIER CORPORATION, Farmington, CT (US)

( * ) Notice: Subject to any disclaimer, the term of this patent is extended or adjusted under 35 U.S.C. 154(b) by 370 days.

(21) Appl. No.: 13/389,576

(22) PCT Filed: Nov. 9, 2010

(86) PCT No.: PCT/US2010/055989
§ 371 (c)(1),
(2), (4) Date: Mar. 5, 2012

(87) PCT Pub. No.: WO2011/062808
PCT Pub. Date: May 26, 2011

(65) Prior Publication Data
US 2013/0199220 A1 Aug. 8, 2013

Related U.S. Application Data

(60) Provisional application No. 61/263,687, filed on Nov. 23, 2009.

(51) Int. Cl.
*F24F 6/00* (2006.01)
*F24F 6/12* (2006.01)
(Continued)

(52) U.S. Cl.
CPC .............. *F24F 6/12* (2013.01); *B01D 53/263* (2013.01); *F24F 3/1417* (2013.01); *F24F 6/00* (2013.01);
(Continued)

(58) Field of Classification Search
CPC ........ F24F 6/12; F24F 6/00; F24F 2003/1435; F24F 3/1417; F25D 17/06; F25D 17/00; F25D 23/00; B01D 53/263
(Continued)

(56) References Cited

U.S. PATENT DOCUMENTS 2,125,842 A * 8/1938 Eggleston .................... 62/238.6
4,259,849 A 4/1981 Griffiths
(Continued)

FOREIGN PATENT DOCUMENTS

JP 09-222244 8/1997
JP 1997222244 A * 8/1997
(Continued)

OTHER PUBLICATIONS

International Search Report and Written Opinion for related International Application No. PCT/US2010/055989; report dated Feb. 15, 2011.

*Primary Examiner* — David Teitelbaum
*Assistant Examiner* — Harry Arant
(74) *Attorney, Agent, or Firm* — Cantor Colburn LLP (57) ABSTRACT

An air temperature and humidity control device using a liquid-desiccant humidity controller thermally coupled to a heat pump is disclosed. The humidity controller may include a contactor having at least one contact module with a porous sidewall that is permeable to water vapor and impermeable to the liquid desiccant. The disclosed device provides air temperature control through heat transfer between the liquid desiccant and heat pump and provides humidity controls through water transfer between the desiccant and surrounding air.

18 Claims, 4 Drawing Sheets

(51) Int. Cl.
  *B01D 53/26* (2006.01)
  *F24F 3/14* (2006.01)
  *F24F 11/00* (2018.01)

(52) U.S. Cl.
  CPC ... *F24F 11/0008* (2013.01); *F24F 2003/1435* (2013.01)

(58) Field of Classification Search
  USPC ........................................ 62/93, 94, 271, 274
  See application file for complete search history.

(56) References Cited

U.S. PATENT DOCUMENTS

| | | | |
|---|---|---|---|
| 4,458,500 A | 7/1984 | Grossman et al. | |
| 4,546,620 A | 10/1985 | Biermann | |
| 4,984,434 A * | 1/1991 | Peterson | F24F 3/1411 62/271 |
| 5,435,146 A | 7/1995 | Clark | |
| 5,966,955 A | 10/1999 | Maeda | |
| 6,389,841 B1 | 5/2002 | Feldman, Jr. et al. | |
| 6,564,567 B2 | 5/2003 | Skupin et al. | |
| 7,043,930 B2 | 5/2006 | Bussjager | |
| 7,290,399 B2 | 11/2007 | Taras et al. | |
| 7,503,183 B2 | 3/2009 | Bussjager | |
| 2002/0078696 A1* | 6/2002 | Korin | 62/80 |
| 2005/0252229 A1 | 11/2005 | Moratalla | |
| 2006/0248910 A1* | 11/2006 | Smolko et al. | 62/315 |
| 2009/0175748 A1 | 7/2009 | Bush et al. | |
| 2009/0192650 A1 | 7/2009 | Tonner | |

FOREIGN PATENT DOCUMENTS

| | | | |
|---|---|---|---|
| JP | 11-044439 | 2/1999 | |
| JP | 1999044439 A * | 2/1999 | F24F 5/00 |
| JP | 11-137948 | 5/1999 | |

* cited by examiner

METHOD AND DEVICE FOR AIR CONDITIONING WITH HUMIDITY CONTROL

CROSS-REFERENCE TO RELATED APPLICATION

This application is a 35 USC § 371 US National Stage patent application of International Patent Application No. PCT/US2010/055989 filed on Nov. 9, 2010, and claims priority under 35 USC § 119(e) to U.S. Provisional Patent Application Ser. No. 61/263,687 filed on Nov. 23, 2009.

BACKGROUND

1. Technical Field

An air temperature and humidity control device using a liquid-desiccant humidity controller thermally coupled to a heat pump is disclosed. The humidity controller includes a contactor having at least one contact module with a porous sidewall that is permeable to water vapor and impermeable to the liquid desiccant. The disclosed device controls air temperature through heat transfer between the liquid desiccant and heat pump and controls humidity through water transfer between the desiccant and surrounding air.

2. Description of the Related Art

Conventional air conditioning systems generally do not perform humidity control functions. In case humidity control is desired, air conditioners based on direct expansion (DX) may be operated to condense moisture in the air through supercooling. The drier, supercooled air is then reheated for comfort before entering into a facility to be air-conditioned. Significant energy is consumed during the supercooling and reheating, which renders the process inefficient. Moreover, water condensation on metallic DX coils may cause corrosion problems, which adds to the maintenance cost of the air conditioning systems.

In light of the need for more efficient humidity control, air conditioning systems with desiccant wheels separated from temperature control units have been developed. The desiccant wheel is loaded with a solid desiccant and is positioned just downstream of the temperature control unit so that cooled air transversely passes a ¾ section of the rotating desiccant wheel, during which the moisture in the air is absorbed by the desiccant. The remaining ¼ section of the desiccant wheel is reheated so that the absorbed moisture can be desorbed to regenerate the desiccant. While capable of achieving low humidity outputs, systems based on desiccant wheels may be space-consuming and may suffer from lack of efficiency, as heating energy is required to regenerate the desiccant. Moreover, because the desiccant wheel is relatively cumbersome and not easy to install or uninstall, the capacity and operation of the systems based on desiccant wheels are generally not modular enough to accommodate a wide range of operations.

Besides desiccant wheels, humidity control may be achieved with an air conditioning system having a heat pump coupled to a liquid desiccant loop so that the liquid desiccant, such as lithium chloride, can be cooled and heated by the heat pump. The desiccant loop includes two contact towers loaded with packing materials. Several sprinklers are provided at the top end of the tower to distribute the liquid desiccant (cooled or heated by the heat pump) onto the packing materials, while air is blown from the bottom end of the contact tower as the liquid desiccant trickles down the packing material. As a result of the direct contact between the desiccant and air, water may be absorbed from the air into the desiccant or desorbed from the desiccant into the air. Simultaneously, the air may be heated or cooled by the liquid desiccant.

Because of its integration with a heat pump, the liquid desiccant system discussed above requires less energy for the desorbing of water from the liquid desiccant, i.e. the regeneration of the liquid desiccant. However, as the operation of the system requires direct contact between numerous streams of liquid desiccant and air, significantamount of noises, e.g. bubbling noise, are generated by the system, which may disturb the ambience of the room or facility that is the subject of the system. The entrainment of liquid desiccant droplets into the air stream is inherent to spraying direct contact technologies. Such liquid desiccant entrainment (or liquid desiccant carryover) can cause corrosion of ductwork and human health issues. Moreover, similar to the desiccant wheels, the contact towers of the above-discussed system is relatively cumbersome in construction and not easy to modulate to accommodate a wide range of operations.

Hence, there is a need for an air conditioning system with humidity control capabilities. Moreover, there is a need for an air conditioning system that achieves humidity control in an energy efficient and discreet manner. Finally, there is a need for an air conditioning system with modular humidity control to conveniently accommodate a wide range of operational needs.

SUMMARY OF THE DISCLOSURE

In satisfaction of the aforementioned needs, an improved air temperature and humidity control device is disclosed. In one aspect of this disclosure, the device may include a heat pump, a humidity controller, and a blower. The heat pump may include a condenser, an evaporator, and a compressor, among which a refrigerant may be circulated.

The humidity controller may include a contactor and a liquid desiccant flowing therethrough. The heat pump and humidity controller may be thermally coupled together so as to allow the liquid desiccant to be heated in the condenser and cooled in the evaporator. In one embodiment, the contactor is connected to the condenser and evaporator through first and second desiccant conduits, respectively.

The contactor may include at least one contact module with a porous sidewall having exterior and interior sides, wherein the interior side of the sidewall defines an internal space in which the liquid desiccant flows. The blower generates airflow along the exterior side of the sidewall in order to provide desirable air temperature and humidity.

In another aspect of this disclosure, a method of controlling air humidity and temperature is provided. The method may include the steps of: circulating a refrigerant in a heat pump comprising a condenser, an evaporator, and a compressor; circulating a desiccant in a humidity controller comprising a contactor connected to the condenser and evaporator through first and second desiccant conduits, the contactor comprising at least one contact module with a porous sidewall having exterior and interior sides, the interior side of the sidewall defining an internal space in which the liquid desiccant flows; and generating airflow along the exterior side of the sidewall of the contact module.

Other advantages and features of the disclosed methods and device will be described in greater detail below. It will also be noted here and elsewhere that the device or method disclosed herein may be suitably modified to be used in a wide variety of applications by one of ordinary skill in the art without undue experimentation.

BRIEF DESCRIPTION OF THE DRAWINGS

For a more complete understanding of the disclosed device and method, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed device or method which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

This disclosure is generally related to an improved air temperature and humidity control device. In a first embodiment schematically illustrated in FIG. 1, the device 10 may include a heat pump 20, a humidity controller 30, and a blower 50. The heat pump 20 may include a compressor 21, an evaporator 22, and a condenser 23. In operation, a refrigerant 24 may be circulated in the heat pump 20 among the evaporator 22, condenser 23, and compressor 21 so that the refrigerant 24 is in a compressed state (heat releasing) in the condenser 23 and is in an expanded state (heat absorbing) in the evaporator 22. As a non-limiting example, the refrigerant may be an environmentally friendly refrigerant based on R-410. Other suitable refrigerants may also be used by one of ordinary skill in the art in view of this disclosure without undue experimentation.

Figure 1:
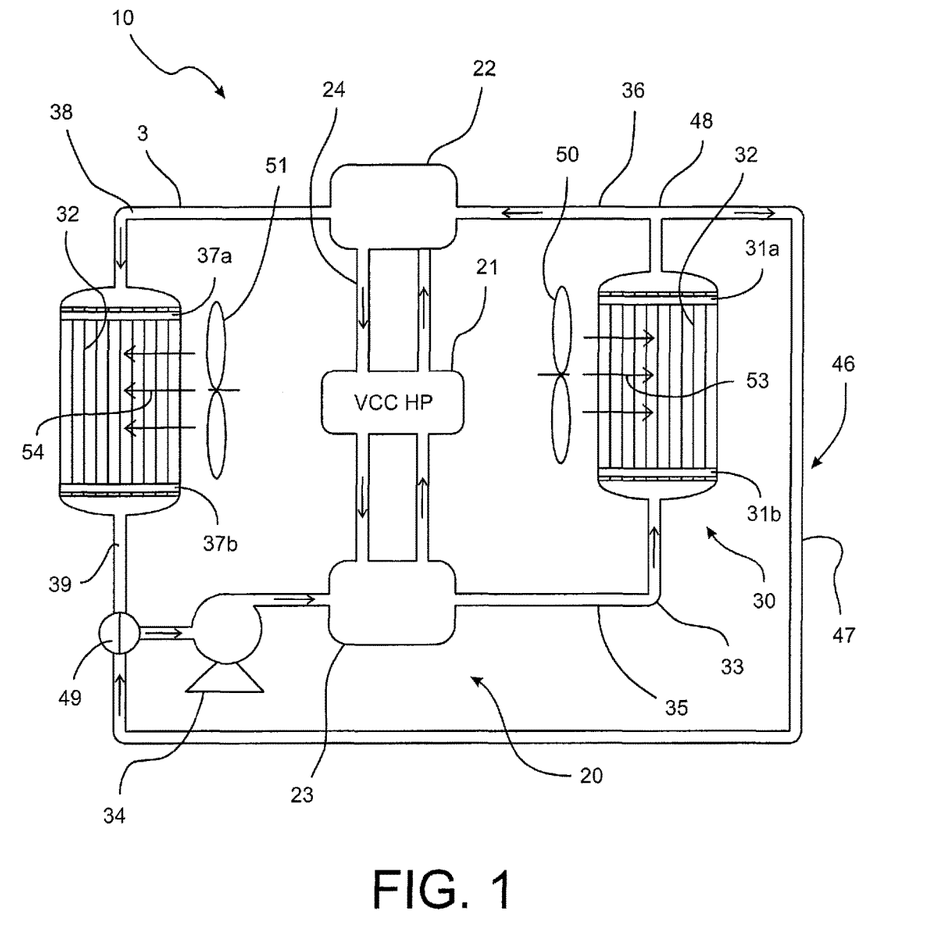
FIG. 1 is a schematic illustration of an air temperature and humidity control device according to one embodiment of this disclosure.

The humidity controller 30 may include a first contactor 31 and a liquid desiccant 33 flowing therethrough. The heat pump 20 and humidity controller 30 may be thermally coupled together so as to allow the liquid desiccant 33 to be heated in the condenser 23 and cooled in the evaporator 22. In one embodiment, the first contactor 31 is connected to the condenser 23 and evaporator 22 through first and second desiccant conduits (35, 36), respectively. In one embodiment, the liquid desiccant is an aqueous lithium chloride solution. Other hygroscopic liquid substances may also be used as the liquid desiccant and should be considered as within the contemplation of this disclosure.

As illustrated in FIG. 1, the liquid desiccant 33 may be driven by a fluid pump 34 to flow sequentially through the condenser 23, first contactor 31, and evaporator 22. However, it is to be understood that the fluid pump 34 may be reversed to allow the liquid desiccant 33 to flow sequentially through the evaporator 22, first contactor 31, and condenser 23.

The disclosed device 10 may also include a first blower 50 for generating airflow 53 over the first contactor 31. In one embodiment, the first blower 50 may include an electric fan positioned adjacent to the first contactor 31. In another embodiment, the electric fan may be substituted by an air outlet of an HVAC system. As the airflow 53 passes over the first contactor 31, heat and/or water transfers between the airflow 53 and liquid desiccant 33 in the first contactor 31 allow the disclosed device 10 to provide desirable air temperature and/or humidity.

As a second embodiment (also schematically illustrated in FIG. 1), the humidity controller 30 may further include a second contactor 37 through which the desiccant 33 flows. The second contactor 37 may also be thermally coupled to the condenser 23 and evaporator 22 through third and fourth desiccant conduits (38, 39). As illustrated in FIG. 1, the liquid desiccant 33 may be driven by the fluid pump 34 to flow sequentially through the evaporator 22, second contactor 37, and condenser 23. Here again, the fluid pump 34 may be reversed to allow the liquid desiccant 33 to flow sequentially through the condenser 23, first contactor 31, and evaporator 22.

In the second embodiment, a second blower 51 may be provided to generate airflow 54 over the second contactor 37. Similar to the first blower 50, the second blower 51 may include an electric fan positioned adjacent to the second contactor 37. In another embodiment, the electric fan may be substituted by an air outlet of an HVAC system. As the airflow 54 passes over the second contactor 37, heat and/or water transfers between the airflow 54 and liquid desiccant 33 in the second contactor 37 allow the disclosed device 10 to provide desirable air temperature and/or humidity.

To facilitate the thermal coupling between the heat pump 20 and humidity controller 30, the evaporator 22 and the condenser 23 may be both refrigerant-desiccant heat exchangers, rather than refrigerant-air heat exchangers used in conventional air conditioning systems. As a result, no direct expansion (DX) coil is used in the disclosed device. As a non-limiting example, the refrigerant-desiccant heat exchanger used in this disclosure may be of a shell-and-tube design, in which a bundle of tubes is disposed within an outer shell. In operation, one fluid flows through the tubes, and another fluid flows along the tubes (through the shell) to allow heat transfer between the two fluids, in this case the refrigerant 24 and liquid desiccant 33. Other suitable heat exchangers may also be used by one of ordinary skill in the art in view of this disclosure without undue experimentation.

Figure 2:
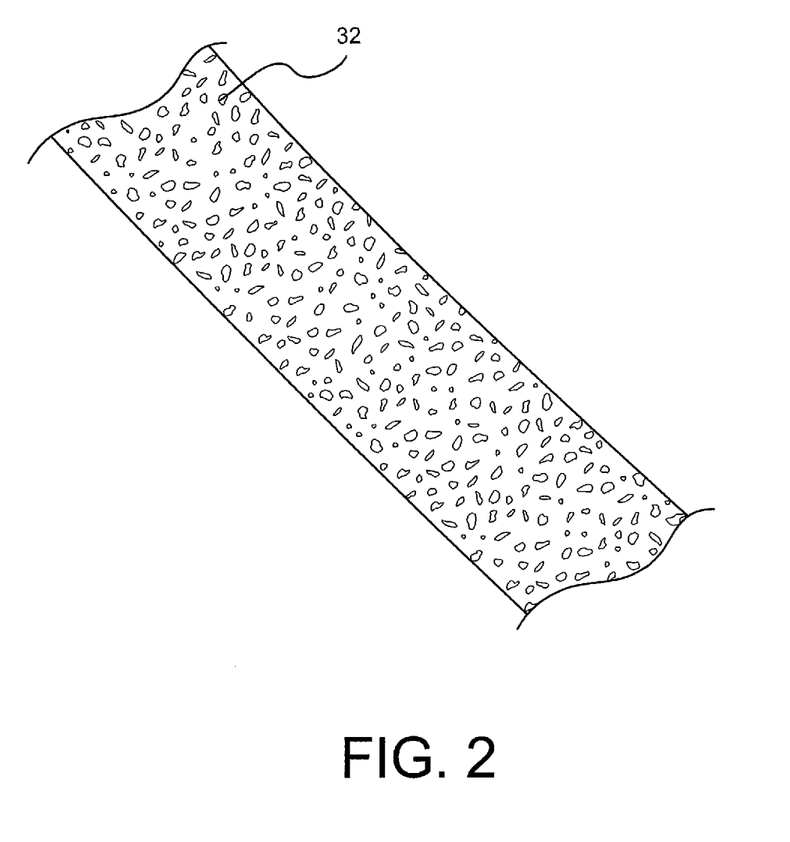
FIG. 2 is a perspective sectional view of a contact module used in the devices shown in FIG. 1.

As illustrated in FIGS. 1-2, the contactors (31, 37) may each include at least one contact module 32 with a porous sidewall 40 having exterior and interior sides (41, 42), wherein the interior side 42 of the sidewall 40 defines an internal space 43 in which the liquid desiccant 33 flows. The contact module 32 may be of a tubular shape as shown in FIG. 2. Moreover, it is to be understood that, in some embodiments, one of the contactors (31, 37) may not include the contact modules 32 disclosed herein but rather uses a known humidity absorbing/desorbing device such as a packed tower or other contactors based on direct contact between liquid desiccant and air.

In some embodiments, the contactors (31, 37) may each include a plurality of contact modules 32 arranged together, either as a two-dimensional panel or a three-dimensional array, to increase the total contact surface area. In one embodiment, the contactor 31 or 37 has a total contact surface area of about 311 m$^2$ and is housed in a duct having an effective dimension of about 1.5 m×22 m×0.5 m. The contactor 31 absorbed moisture from an airflow (temperature=about 29.8° C. and relative humidity=about 75%) at a transfer rate of about 0.239 g/min and at a flux of about 0.180 kg/m$^2$-hr when the latent load is about 35 kW.

As illustrated in FIG. 1, the contactors (31, 37) each includes two end connectors (31a, 31b, 37a, 37b) in order to establish fluid communication between the contact modules 32 and the desiccant conduits (35, 36, 38, 39). Suitable connectors include pipe manifolds, chamber manifolds, or other connectors generally used in fluid transportation. In other embodiments, one of both of the contactors (31, 37) may include only one contact module 32, which in turn may be directly connected to the desiccant conduits (35, 36, 38, 39) without any connector.

The airflow (53, 54) generated by the first and second blowers (50, 51) passes along the exterior side 41 of the sidewall 40 of the contact module 32, such as through the interstitial voids between the contact modules 32. As illustrated in FIG. 1, the air flow (53, 54) orthogonally passes through the contact modules 32. However, the direction of the air flow should not be considered as limiting the scope of this disclosure. For example, the airflow (53, 54) may be oblique or even parallel to the orientation of the contact modules 32 as long as the airflow passes along the exterior side 41 of the sidewall 40.

In order to facilitate humidification and dehumidification, the porous sidewall 40 of the contact module 32 may be permeable to water vapor. On the other hand, the porous sidewall 40 may be impermeable to the liquid desiccant 33 so as to maintain a closed liquid desiccant loop. Thus, in one embodiment, the porous sidewall 40 is made of a hydrophobic porous material, such as a plastic porous material. Examples of suitable materials for the porous sidewall 40 include, but are not limited to, polypropylenes, polyethylenes, polysulfones, polyethersulfones, polyetheretherketones, polyimides, polyphenylene sulfides, polytetrafluoroethylenes, polyvinylidene difluorides, and combinations thereof. In one embodiment, the porous sidewall 40 comprises thermally-resistant polymeric materials, such as polytetrafluoroethylenes, polyvinylidene difluorides, and combinations thereof. In one embodiment, the porous sidewall 40 has a standard pore size of from about 0.01 μm to about 0.8 μm.

Figure 3:
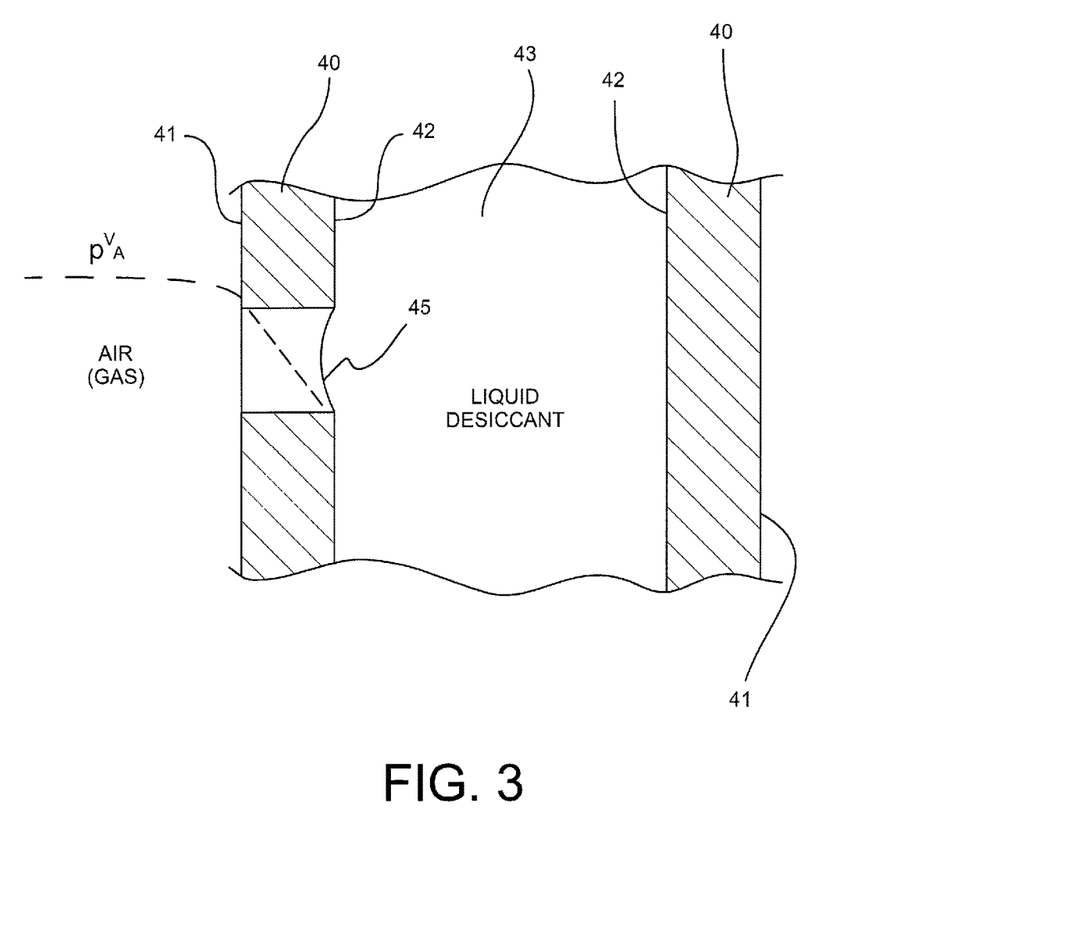
FIG. 3 is a graphic illustration of the sidewall permeability characteristic of the contact module used in this disclosure.
Figure 4:
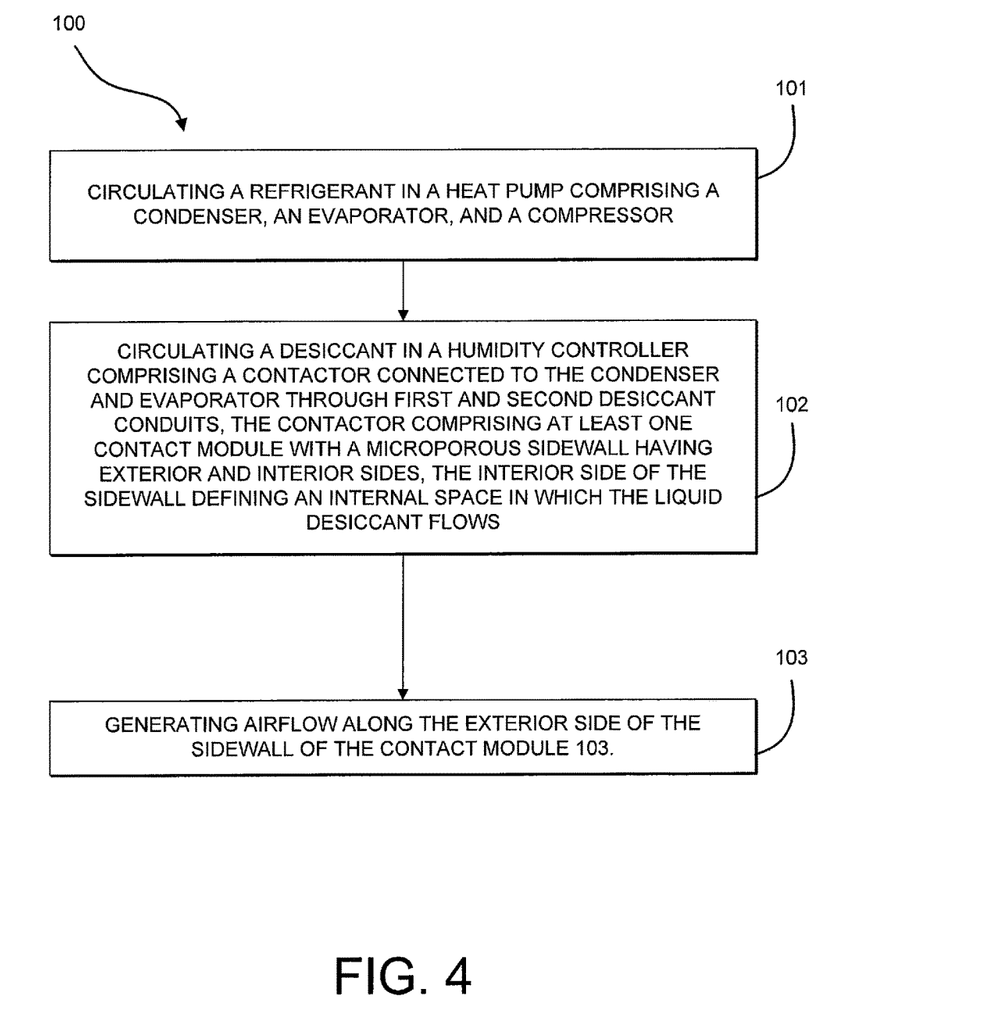
FIG. 4 is a schematic block diagram of a method of controlling air humidity and temperature according to another aspect of this disclosure.

Without wishing to be bound by any particular theory, it is contemplated that the interaction force between the hydrophobic porous material and the liquid desiccant 33, when balanced against the surface tension between the liquid desiccant 33 and air, allows the liquid desiccant 33 to form concave meniscuses 45 on the interior side 42 of the porous sidewall 40 as illustrated in FIG. 3, thereby retaining the liquid desiccant 33 within the internal space 43 defined by the porous sidewall 40. Meanwhile, the water vapor pressure differential across the porous sidewall allows water vapor to be absorbed from the airflow into the liquid desiccant or to be desorbed from the liquid desiccant to the airflow depending on factors such as the temperatures of the airflow and liquid desiccant, the concentration and hygroscopicity of the liquid desiccant, etc.

As a result of such distinct permeability characteristics, the liquid desiccant 33 may be essentially free of any direct contact with the airflow (53, 54) during humidification or dehumidification operation of the disclosed device 10, thereby addressing the noise problem encountered by existing liquid desiccant approaches based on packed contact towers.

The arrangement of the contact module(s) in the contactor may vary depending on factors such as the dimension and/or capacity of the air conditioning system, as well as cost and performance requirements of specific operations. For example, the contactor may comprise a plurality of serial contact modules, a plurality of parallel contact modules, or combinations thereof. In one embodiment, the disclosed 10 device is more compact and energy efficient, and less expensive than existing devices based on desiccant wheels while providing a similar or even better humidity control performance.

Turning back to FIG. 1, the second contactor 37 is positioned downstream of the evaporator 22 and upstream of the condenser 23 so that the liquid desiccant 33 may be cooled in the evaporator 22 to below ambient temperature. The desiccant 33 in turn cools the contact module 32 of the second contactor 37 as it flows therethrough. As a result, the contact module 32 of the second contactor 37 may absorb heat from and therefore cool the airflow 54 along the exterior side 41 of the contact module 32. Meanwhile, the hygroscopic nature of the liquid desiccant 33 may allow the water vapor in the airflow 54 to be absorbed into the liquid desiccant 33. Thus, the contact module 32 of the second contactor 37 may function to decrease both the temperature and humidity of the airflow along its exterior side.

On the other hand, the first contactor 31 is positioned downstream of the condenser 33 and upstream of the evaporator 22, in which case the desiccant 33 may be heated in the condenser 33 to above ambient temperature. As the heated liquid desiccant 33 flows through the contact module 32 of the first contactor 31, the water vapor differential across the porous sidewall 40 created by the temperature difference may allow the liquid desiccant 33 to releases water vapor into the airflow 53, causing the liquid desiccant 33 to be more concentrated and hygroscopic than before entering the contact module 32. At the same time, the contact module 32 of the first contactor 31, heated by the liquid desiccant 33 flowing therethrough, may release heat to the airflow 53 along the exterior side 41 of the contact module 32. Thus, the contact module 32 of the first contactor 31 may function to increase both the temperature and humidity of the airflow 53 along its exterior side 40.

In summertime application (when outside air is hot and humid), the device illustrated in FIG. 1 may be configured so that the second contactor 37 is positioned closed to an interior air vent of a facility to be air-conditioned so that the airflow 54, after being cooled and dehumidified by the second contactor 37, can be introduced into the facility for comfort. The first contactor 31, on the other hand, is positioned on the exterior side of the facility so that the air flow 53, after heated and humidified by the first contactor 37, is dispelled into the outside air, thereby regenerating (by concentrating) the liquid desiccant 33 to maintain an absorption and desorption cycle of heat and moisture.

In wintertime application (when outside air is cold and dry), the device 10 may reverse its operation to increase the temperature and humidity of incoming air and do so without relocating the first and second contactors (31, 37). In one embodiment, the fluid pump 34 may reverse its operation so that the liquid desiccant 33 flows in a direction that is opposite to what is shown in FIG. 1. As a result, the airflow 54, after heated and humidified by the second contactor 37, is introduced into the facility while the air flow 53, after cooled and dehumidified by the first contactor 37, is dispelled into the outside air. Alternatively, instead of reversing the operation of the fluid pump 34, the operation of the heat pump 20 may be reversed so that the evaporator 22 and condenser 23 switch their places with each other.

As illustrated in FIG. 1, the device may also include an optional liquid desiccant bypass loop 46 that bypasses the evaporator 22 and the second contactor 37. The bypass loop 46 may include a first joint 48 positioned downstream of the first contactor 31 and upstream of the evaporator 22, a second joint 49 positioned downstream of the second contactor 37 and upstream of the condenser 23, and a bypass conduit 47 connecting the first and second joints (48, 49). The bypass loop 46 allows a portion of the liquid desiccant 33 to be reheated and re-concentrated without going through the cooling and dehumidification process, which facilitates the regeneration of the liquid desiccant with a higher hygroscopicity if desired.

In the non-limiting embodiment illustrated in FIG. 1, the first joint 48 is a three-way connector and the second joint 49 is a three-way metering valve. The bypass ratio is 0.6 in one embodiment. However, other configurations and bypass ratios of the bypass loop that allows effective control of the hygroscopicity of the regenerated liquid desiccant may also be available to one of ordinary skill in the art in view of this disclosure without undue experimentation.

In another aspect of this disclosure illustrated in FIG. 6, a method of controlling air humidity and temperature 100 is provided. The method may include the steps of: circulating a refrigerant in a heat pump comprising a condenser, an evaporator, and a compressor 101; circulating a desiccant in a humidity controller comprising a contactor connected to the condenser and evaporator through first and second desiccant conduits, the contactor comprising at least one contact module with a porous sidewall having exterior and interior sides, the interior side of the sidewall defining an internal space in which the liquid desiccant flows 102; and generating airflow along the exterior side of the sidewall of the contact module 103.

INDUSTRIAL APPLICABILITY

The air temperature and humidity control device disclosed herein may have a wide range of industrial, commercial or household applications due to the modular nature of the contactors used in the device. The device may be used in facilities requiring strict humidity control, such as an operating room, to provide low humidity outputs (e.g. ~18 gr/lbda) that are conventionally achieved by desiccant wheels. Moreover, the disclosed device achieves a wide range of humidity control in an energy efficient and/or discreet manner.

While only certain embodiments have been set forth, alternative embodiments and various modifications will be apparent from the above descriptions to those skilled in the art. These and other alternatives are considered equivalents and within the spirit and scope of this disclosure.

What is claimed is:

1. An air temperature and humidity control device comprising:
a heat pump comprising a condenser fluidly coupled to a compressor that is fluidly coupled to an evaporator, the evaporator fluidly coupled to the condenser;
a humidity controller comprising a first contactor fluidly coupled between the condenser and the evaporator, the evaporator being a refrigerant-desiccant heat exchanger, the first contactor directly connected to the evaporator, the first contactor comprising a first at least one contact module including a porous sidewall defining an internal space for carrying a liquid desiccant therein and from the condenser to the evaporator, the porous sidewall being permeable to water vapor but impermeable to the liquid desiccant;
a second contactor fluidly coupled between the evaporator and the condenser, the second contactor comprising a second at least one contact module including a porous sidewall defining an internal space for carrying a liquid desiccant therein, the condenser, the compressor, and the evaporator providing a first communication circuit, the condenser, the first contactor, the evaporator, and the second contactor providing a second communication circuit that is not in fluid communication with the first communication circuit;
a blower for generating an airflow in communication with the sidewall of the first at least one contact module; and
a bypass loop comprising a first joint positioned downstream of the first contactor and upstream of the evaporator, a second joint positioned downstream of the second contactor and upstream of the condenser, and a bypass conduit connecting the first and second joints, the bypass loop configured to simultaneously direct a first portion of the liquid desiccant from an outlet of the first contactor to an inlet of the condenser and a second portion of the liquid desiccant from the outlet of the first contactor to an inlet of the evaporator.

2. The device of claim 1, wherein the condenser is a refrigerant-desiccant heat exchangers.

3. The device of claim 1, wherein a liquid desiccant disposed in the first or second at least one contact module is essentially free of any direct contact with an airflow in communication with the first or second at least one contact module.

4. The device of claim 1, wherein the porous sidewall includes a hydrophobic porous material.

5. The device of claim 4, wherein the hydrophobic porous material includes plastic.

6. The device of claim 1, wherein the first contactor is positioned downstream of the condenser and upstream of the evaporator.

7. The device of claim 6, wherein a liquid desiccant disposed in the first contactor releases water to an airflow in communication with the first at least one contact module.

8. The device of claim 6, wherein the first contactor releases heat to an airflow in communication with the first at least one contact module.

9. The device of claim 1, wherein the first contactor is positioned downstream of the evaporator and upstream of the condenser.

10. The device of claim 9, wherein a liquid desiccant absorbs water from an airflow in communication with the first at least one contact module.

11. The device of claim 9, wherein the first contactor absorbs heat from an air flow in communication with the first at least one contact module.

12. The device of claim 1, wherein the first contactor is positioned downstream of the condenser and upstream of the evaporator and the second contactor is positioned downstream of the evaporator and upstream of the condenser.

13. A method of controlling air humidity and temperature, the method comprising:
circulating a refrigerant in a heat pump comprising a condenser, a compressor, an evaporator, wherein the condenser, the compressor, and the evaporator form a first communication circuit;
circulating a liquid desiccant in a humidity controller comprising a first contactor fluidly coupled between the condenser and the evaporator, the first contactor comprising a first at least one contact module including a porous sidewall defining an internal space for carrying a liquid desiccant therein and a second contactor fluidly coupled between the condenser and the evaporator, the evaporator being a refrigerant-desiccant heat exchanger, the second contactor directly connected to the evaporator, the second contactor comprising a second at least one contact module including a porous sidewall defining an internal space in which the liquid desiccant flows through a second communication circuit through the condenser, the second contactor, the evaporator and the first contactor, the first and second communication circuits not being in communication with each other;

generating airflow in communication with the sidewall of the first and second at least one contact module; and providing a bypass loop comprising a first joint positioned downstream of the second contactor and upstream of the evaporator, a second joint positioned downstream of the first contactor and upstream of the condenser, and a bypass conduit connecting the first and second joints, the bypass loop configured to simultaneously direct a first portion of the liquid desiccant from an outlet of the first contactor to an inlet of the condenser and a second portion of the liquid desiccant from the outlet of the first contactor to an inlet of the evaporator.

14. The method of claim 13, wherein the porous sidewall is permeable to water vapor and impermeable to the liquid desiccant.

15. The method of claim 13, therein the liquid desiccant is essentially free of any direct contact with the airflow.

16. The method of claim 13, wherein the porous sidewall includes a hydrophobic porous material.

17. The method of claim 16, wherein the hydrophobic porous material includes plastic.

18. The method of claim 13, wherein the condenser is a refrigerant-desiccant heat exchangers.

* * * * *